United States Patent [19]
Matsumura

[11] Patent Number: 5,757,422
[45] Date of Patent: May 26, 1998

[54] TRACKING AREA DETERMINATION APPARATUS AND OBJECT TRACKING APPARATUS UTILIZING THE SAME

[75] Inventor: Hideki Matsumura, Sakyo-ku, Japan

[73] Assignee: Sanyo Electric Company, Ltd., Osaka, Japan

[21] Appl. No.: 606,992

[22] Filed: Feb. 26, 1996

[30] Foreign Application Priority Data

Feb. 27, 1995 [JP] Japan .................. 7-038204

[51] Int. Cl.$^6$ .................. H04N 6/225; H04N 5/14; H04N 9/64
[52] U.S. Cl. .................. 348/169; 348/699
[58] Field of Search .................. 348/169, 170, 348/171, 172, 699; H04N 5/225, 5/14, 9/64

[56] References Cited

U.S. PATENT DOCUMENTS

| | | | |
|---|---|---|---|
| 4,890,160 | 12/1989 | Thomas | 358/105 |
| 5,034,986 | 7/1991 | Karmann et al. | 348/169 |
| 5,036,393 | 7/1991 | Samad et al. | 348/699 |
| 5,363,146 | 11/1994 | Saunders et al. | 348/699 |
| 5,485,224 | 1/1996 | Burns et al. | 348/699 |
| 5,574,498 | 11/1996 | Sakamoto et al. | 348/169 |

FOREIGN PATENT DOCUMENTS

| | | |
|---|---|---|
| 0 458 239 A2 | 11/1991 | European Pat. Off. . |
| 0 458 239 A3 | 11/1991 | European Pat. Off. . |
| 0 458 373 A2 | 11/1991 | European Pat. Off. . |
| 0 458 373 A3 | 11/1991 | European Pat. Off. . |
| 0 557 007 A2 | 8/1993 | European Pat. Off. . |

OTHER PUBLICATIONS

European Patent Office Communications with European Search Report for European Patent Application No. 96102919.6 dated Feb. 6, 1997.

*Primary Examiner*—Tommy P. Chin
*Assistant Examiner*—Nhon Diep
*Attorney, Agent, or Firm*—Armstrong, Westerman, Hattori, McLeland & Naughton

[57] ABSTRACT

An object tracking apparatus includes a motion vector detection circuit in which a correlation value for each of detection blocks are evaluated by a first correlator on the basis of a portion motion vector of each of the detection blocks and a reference vector. If the correlation value is smaller than a threshold value, the detection block corresponding to the correlation value is regarded as a detection block constituting a tracking area. A gravity of the tracking area is detected by a gravity detection circuit, and a motion vector is generated by a motion vector generator on the basis of the gravity. A universal head is driven in accordance with the motion vector, whereby a specific object can be tracked automatically.

8 Claims, 17 Drawing Sheets

TRACKING AREA DETERMINATION APPARATUS AND OBJECT TRACKING APPARATUS UTILIZING THE SAME

BACKGROUND OF THE INVENTION

1. Field of the Invention

The present invention relates to a tracking area determination apparatus and an object tracking apparatus utilizing the tracking area determination apparatus. More specifically, the present invention relates to a tracking area determination apparatus and an object tracking apparatus utilizing the tracking area determination apparatus which utilizes a representative point matching method.

2. Description of the Prior Art

Two examples of conventional such a kind of object tracking apparatus are disclosed, for example in Japanese Patent Application Laying-Open No. 2-117276 laid-open on May 1, 1990. One is an apparatus in which an optical flow as shown in FIG. 16(b) and a histogram of the optical flow as shown in FIG. 16(c) are detected on the basis of an object image as shown in FIG. 16(a), and then, an object tracking area as shown in FIG. 16(d) is determined. In the other, a person B existing at a center of the image shown in FIG. 16(d) is set as a specific object, and then, an object tracking area as shown in FIG. 17(c) is determined on the basis of an optical flow as shown in FIG. 17(a) and a histogram as shown in FIG. 17(b).

However, in the former, since it is impossible to distinguish the specific object from other objects, it is difficult to track the specific object if the other objects move. On the other hand, in the later, although it is possible to track the specific object, it is necessary to manually set the specific object, and therefore, an operation becomes troublesome.

SUMMARY OF THE INVENTION

Therefore, a principal object of the present invention is to provide a tracking area determination apparatus capable of determining an object a tracking area automatically.

Another object of the present invention is to provide an object tracking apparatus capable of tracking only a specific object.

According to the present invention tracking area determination apparatus which determines an object tracking area within a screen comprises: a first correlation means which evaluates a portion motion vector for each of a plurality of detection blocks defined within the screen on the basis of a minimum correlation value between representative point data in a last field and pixel data in a present field; a second correlation means which evaluates a correlation value between the portion motion vector and a reference vector for each of the plurality of detection blocks; and a determination means which determines detection blocks by which an object tracking area is to be defined on the basis of comparison of the correlation value and a predetermined threshold value.

In accordance with the present invention, the portion motion vectors of the plurality of detection blocks formed within the screen are evaluated by the first correlation means on the basis of the minimum correlation values between the representative point data in the last field and the pixel data in the present field. Then, the correlation values between respective portion motion vectors and the reference vector are evaluated by the second correlation means. Furthermore, the detection blocks which constitute the object tracking area are determined by comparing the correlation values and the predetermined threshold value by the determination means.

In an aspect of the present invention, the reference vector of the next field is evaluated on the basis of the portion motion vectors in the tracking area of the present field.

In another aspect of the present invention, an operation mode is set into a first mode by a first mode setting means. Then, the first correlation means evaluates the portion motion vectors in all the detection blocks formed in the screen.

In a further aspect of the present invention, the operation mode is set into a second mode by a second mode setting means. Then, the first correlation means evaluates the portion motion vectors of the detection blocks constituting the tracking area of the last field and detection blocks adjacent to the tracking area at an outside of the tracking area.

In accordance with the present invention, since the detection blocks constituting the tracking area are determined by comparing the correlation value evaluated by the second correlation means and the predetermined threshold value with each other, it is possible to set the tracking area automatically.

According to a second invention, an object tracking apparatus comprises; a first correlation means which evaluates a portion motion vector for each of a plurality of detection blocks defined within a screen on the basis of a minimum correlation value between representative point data in a last field and pixel data in a present field of the plurality of detection blocks; a second correlation means which evaluates a correlation value between the portion motion vector and a reference vector for each of the plurality of detection blocks; a determination means which determines detection blocks by which an object tracking area is to be defined on the basis of the comparison of the correlation value and a predetermined threshold value; a gravity detection means which detects a position of a gravity of the tracking area; a motion vector generating means which generates a motion vector on the basis of the position of the gravity and a position of a center of the screen; and a tracking means which tracks the object according to the motion vector.

In the present invention, the gravity of the tracking area is detected by the gravity detection means, and the motion vector generating means generates the motion vector on the basis of the positions of the gravity and the center of the screen. Then, tracking means tracks the object according to the motion vector.

In accordance with the present invention, since the object is tracked according to the motion vector generated on the basis of the positions of the gravity of the tracking area and the center of the screen, it is possible to track only a specific object included in the tracking area.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
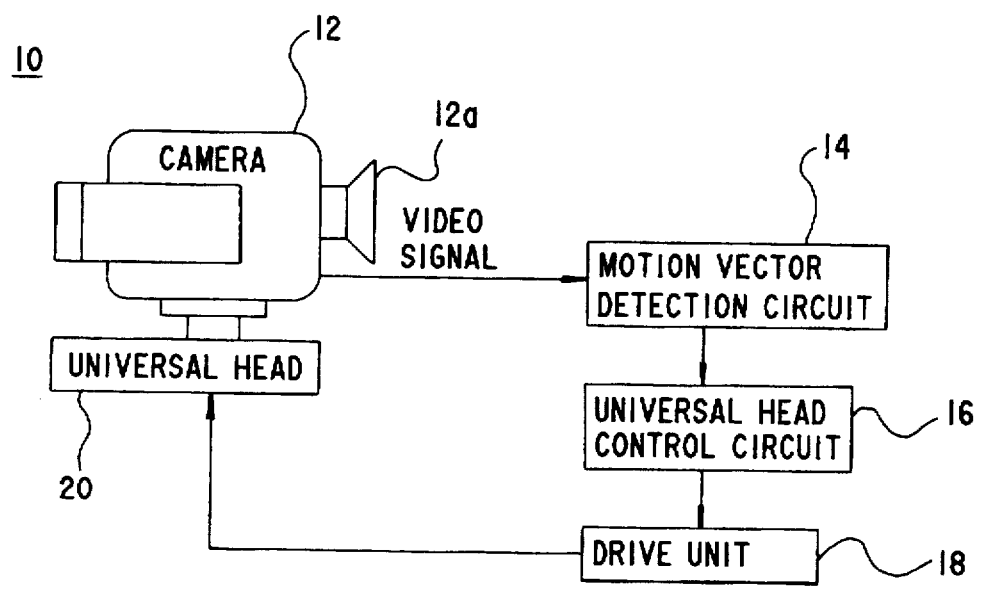
FIG. 1 is a block diagram showing an embodiment according to the present invention.

An object tracking apparatus 10 of this embodiment as shown in FIG. 1 includes a camera 12 which takes an object and outputs an image signal. The image signal is inputted into a motion vector detecting circuit 14 which sets a tracking area on the basis of the image signal and detects a motion vector on the basis of a gravity of the tracking area. The motion vector is applied to an universal head control circuit 16 which outputs a drive signal on the basis of the motion vector for a drive unit 18. The drive unit 18 drives an universal head 20 on the basis of the drive signal. Therefore, the camera 12 is driven to a horizontal direction and/or a vertical direction so as to control an attitude of the camera in a manner that the gravity of the tracking area moves to a center of a screen, whereby an object can be tracked automatically.

Figure 2:
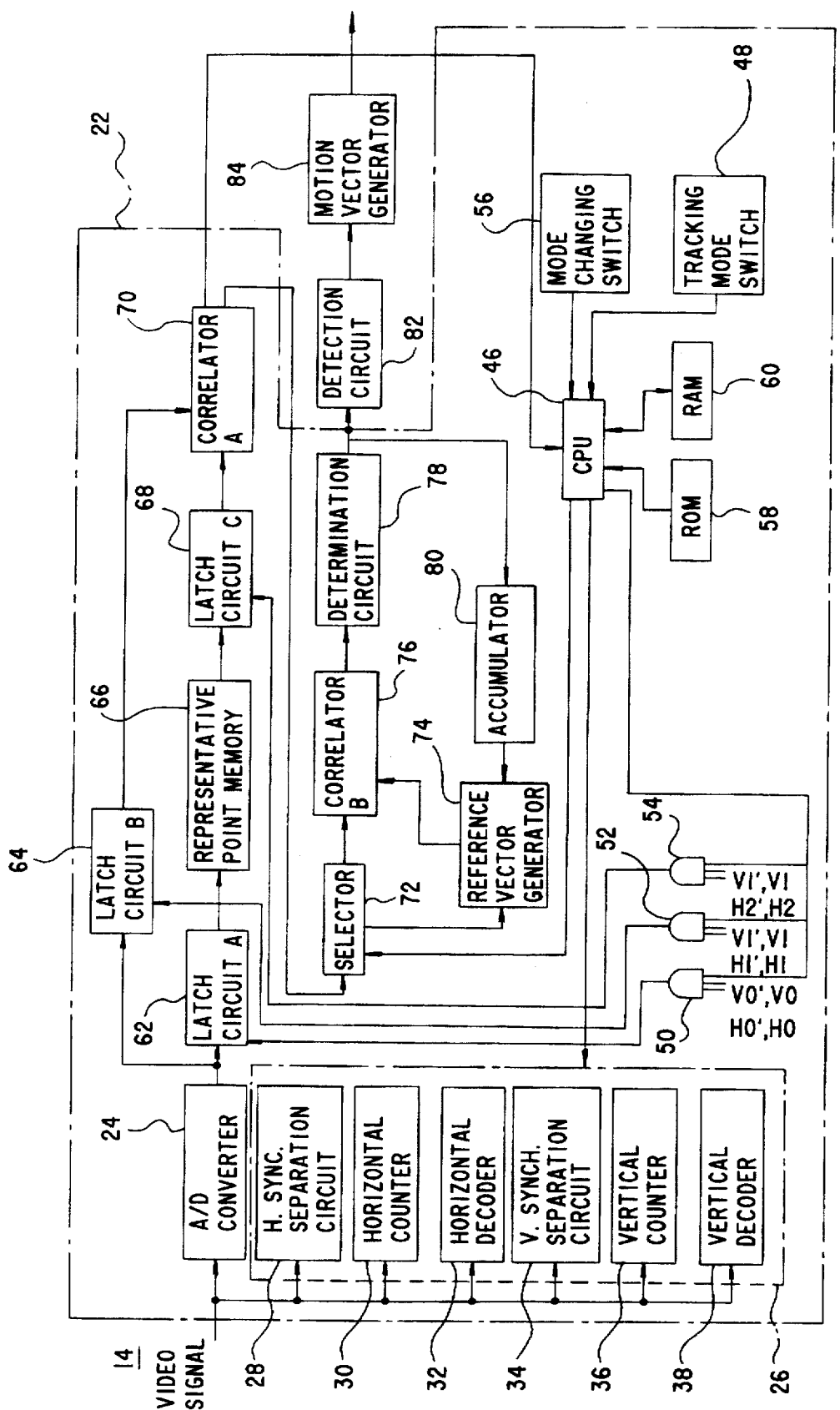
FIG. 2 is a block diagram showing one example of a motion vector detection circuit of the embodiment.

The motion vector detection circuit 14 constructed as shown in FIG. 2 includes a tracking area determination circuit 22. The tracking area determination circuit 22 includes an A/D converter 24 which converts the image signal into digital data for each pixel. The digital data is data obtained by digitally converting Y, R-Y, B-Y signals, for example.

The image signal is also applied to an H-SYNC separation circuit 28 and a horizontal address counter 30 both included in a timing generator 26. The horizontal address counter 30 counts the number of the pixels in the horizontal direction according to the image signal, and resets a count value thereof at every one line in response to a horizontal synchronization signal from the H-SYNC separation circuit 28. The count value of the horizontal address counter 30 is applied to a horizontal decoder 32 which decodes the count value and outputs horizontal signals H0 to H2, H0' to H2, and H0".

Figure 3:
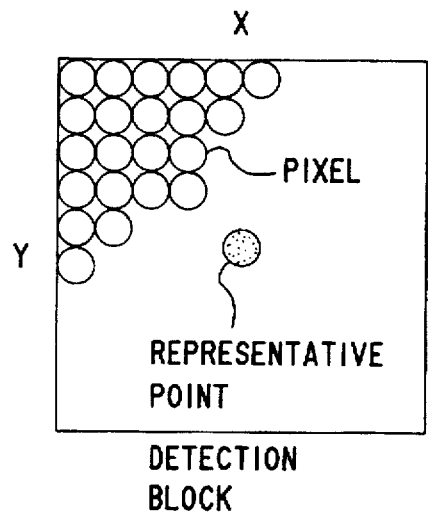
FIG. 3 is an illustrative view showing an operation for detecting a motion vector according to a representative point matching method.
Figure 4:
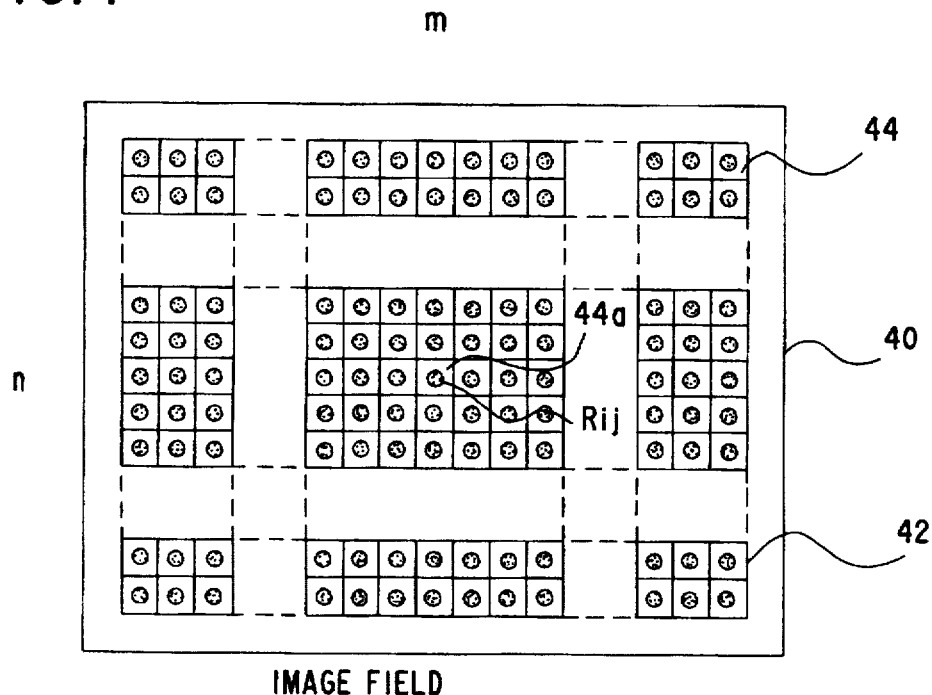
FIG. 4 is an illustrative view showing one example of an arrangement of detection blocks.

The image signal is also applied to a V-SYNC separation circuit 34 and a vertical address counter 36. In the vertical address counter 36, the number of the pixels in the vertical direction is counted in accordance with the image signal, and the vertical address counter 36 is reset at every one field in response to a vertical synchronization signal from the V-SYNC separation circuit 34. A count value of the vertical address counter 36 is applied to a vertical decoder 38 which decodes the count value and outputs vertical signals V0', V1' and V0". Also with referring to FIG. 4 and 5, a screen 40 in which a motion vector detection area 42 is defined is formed in a view finder 12a of the camera 12, and the portion motion vector detection area 42 is divided into detection blocks of 375 (=m×n=25×15), for example. Furthermore, a specific detection block 44a is put in, for example, a center of the motion vector detection area 42. In addition, as shown in FIG. 3, each of the detection blocks 44 includes X pixels in the horizontal direction and Y pixels in the vertical direction, and a center of the detection block becomes a representative point.

Furthermore, the tracking area determination circuit 22 includes a CPU 46 to which a tracking mode switch 48 for starting a tracking mode is connected. When the tracking mode switch 48 is turned-on in a state where a position of the camera 12 is controlled such that a specific object is positioned within the specific detection block 44a, a tracking start signal is applied from the CPU 46 to AND gates 50, 52 and 54. But, in a field that the tracking mode switch 48 is turned-on, that is, in a first field, the tracking start signal is applied to only the AND gate 50.

The CPU 46 is also connected with a mode changing switch 56 which changes the tracking mode between a first mode and a second mode. In the first mode, the tracking area is determined with using all the detection blocks 44 in the motion vector detection area 42. In the second mode, the tracking area is determined with using detection blocks 44 are determined in the last field to constitute the tracking area (the specific detection block 44a in the first field) and detection blocks 44 adjacent to the tracking area at an outside of the area. A mode signal for setting the first mode or the second mode is applied to a timing generator 26.

Figure 5:
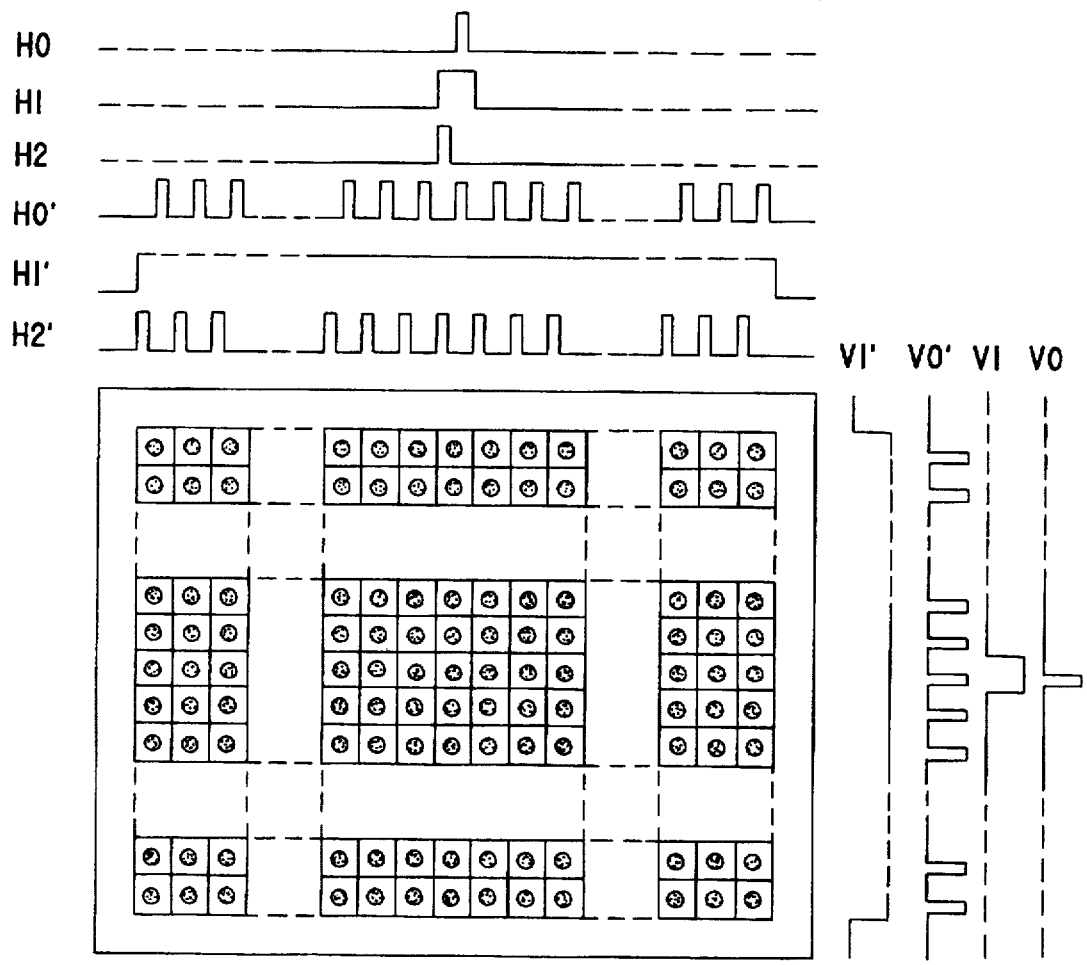
FIG. 5 and FIG. 6 are illustrative views showing the detection blocks, horizontal signals and vertical signals.
Figure 6:
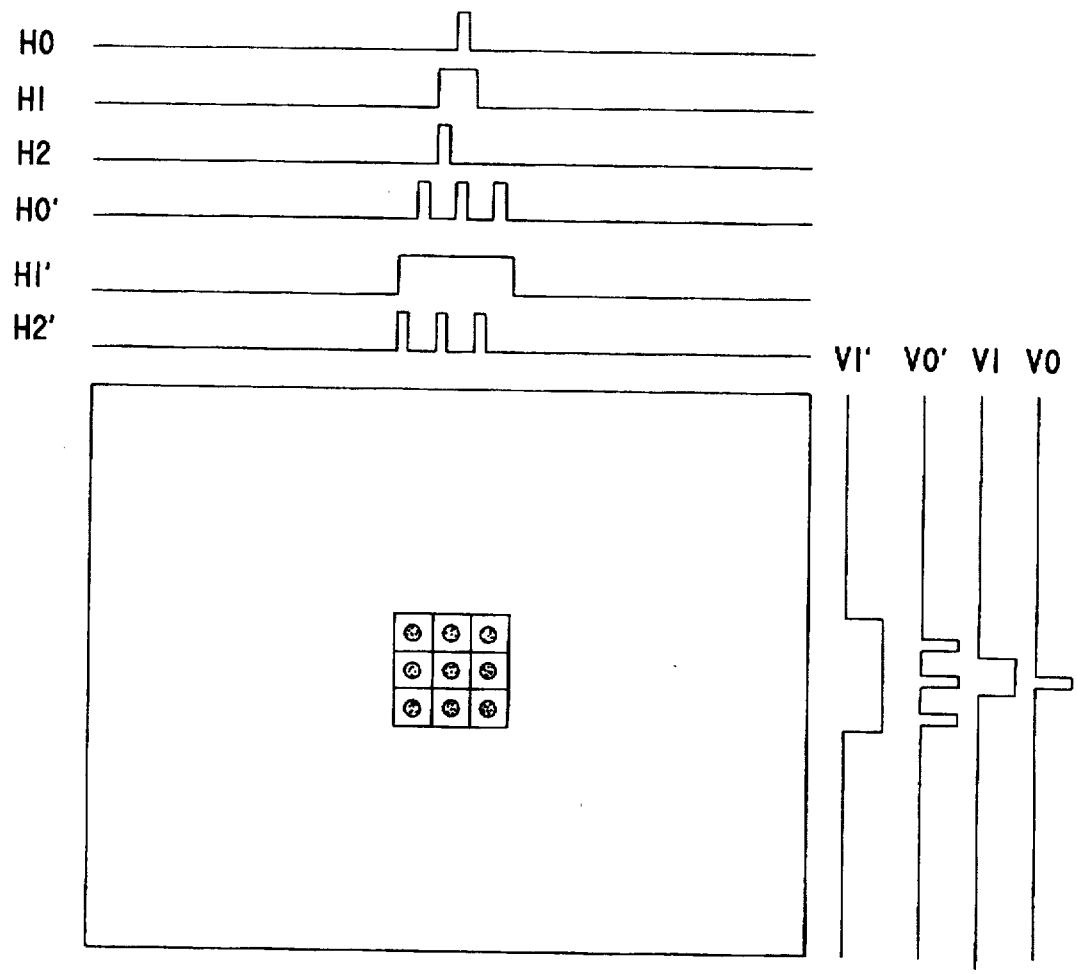

In the first mode, the timing generator 26 outputs the horizontal signals H0 to H2 and H0' to H2' and the vertical signals V0, V1, V0' and V1' as shown in FIG. 5. In addition, waveforms of such signals don't change at every field. On the other hand, in the second mode, the timing generator 26 outputs the horizontal signals H0 to H2 and H0'to H2'and the vertical signals V0, V1, V0' and V1' as shown in FIG. 6 in the first field, and renews the horizontal signals H0' and the vertical signal V0' in accordance with a setting signal from a correlator 70 in the second field, and renews the horizontal signals H0' to H2' and the vertical signals V0' and V1' in accordance with a setting signal from a tracking area determination circuit 78 in and after a third field.

The CPU 46 is also connected with a ROM 58 in which a program for controlling the tracking area determination circuit 22 is stored and a ROM 60 in which data and etc. obtained as a result of an operation are stored.

The digital data of the video signal outputted from the A/D converter 24 is latched by latch circuits 62 and 64 in response to an enable signal from the AND gate 50, and an enable signal from the AND gate 52, respectively. The representative point data of the detection blocks 44 are latched by the latch circuit 62, and all the pixel data in the detection blocks 44 are latched by the latch circuit 64. The representative point data latched by the latch circuit 62 are written in a representative point memory 66 to be read-out in the next field. Then, the representative point data are latched by a latch circuit 68 in response to an enable signal from the AND gate 54. Pixel data of the present field outputted from the latch circuit 64 and the representative point data of the last field outputted from the latch circuit 68 are applied to the correlator 70. The correlator 70 evaluates minimum correlation values performing correlation calculations between both data of the detection blocks 44, and evaluates portion motion vectors during a period of one field of the detection blocks 44 on the basis of the minimum correlation values. In addition, in the second field, the correlator evaluates only one portion motion vector because only representative point data and pixel data of the specific detection block 44a are applied to the correlator 70.

The portion motion vector evaluated in the second field is applied to a reference vector generator 74 through a selector 72, and the portion motion vectors evaluated in and after the third field are applied to a correlator 76 through the selector 72.

In and after the third field, the correlator 70 evaluates the portion motion vectors of all the detection blocks 44 in the first mode, and evaluates the portion motion vectors of detection blocks 44 determined in the last field to constitute the tracking area and detection blocks 44 adjacent to the tracking area at the outside thereof in the second mode. Furthermore, the correlator 76 evaluates correlation values between respective one of the portion motion vectors from selector 72 and a reference vector from the reference vector generator 74 so as to apply the correlation values to the tracking area determination circuit 78.

In the tracking area determination circuit 78, respective one of the correlation values are compared with a predetermined threshold value. The threshold value is set in accordance with a required detection accuracy. That is, when a high detection accuracy is required, the correlation value is set low, and if the high detection accuracy is not required, the correlation value is set high. Only the detection blocks 44 having the correlation values smaller than the predetermined threshold value are determined to constitute the tracking area. As a result, an area A, for example, as shown in FIG. 7(b) and FIG. 7(c), FIG. 15(a) to FIG. 15(c) is determined as the tracking area.

Specifically, in the first mode, the tracking area is determined with using all the detection blocks 44. On the other hand, in the second mode, the setting signal in accordance with a result of determination for the tracking area is applied to the timing generator 26 at every one field, and therefore, the horizontal decoder 32 and the vertical decoder 38 renew the horizontal signals H0' to H2' and the vertical signals V0' and V1' such that the tracking area is changed at every one field. In addition, in only the second field, the correlator 70 outputs the setting signal so as to renew the horizontal signal H0' and the vertical signal V0'.

The portion motion vectors of the detection blocks 44 which are determined by the tracking area determination circuit 78 to constitute the tracking area are applied to an accumulator 80. Then, an x component and a y component of each of the portion motion vectors are accumulated by the accumulator 80, and average values of the x components and the y components are applied to the reference vector generator 74 at every one field. Accordingly, the reference vector is renewed at every one field.

Furthermore, an xy coordinates value of the detection blocks 44 constituting the tracking area is applied to a gravity detection circuit 82 which detects a gravity of the tracking area and applies the gravity data, i.e. ... position data of the gravity to a motion vector generator 84. The motion vector generator 84 generates a motion vector on the basis of position data of a center of the screen 40 and the gravity position data so as to apply to the universal head control circuit 16.

Next, with referring to FIG. 9 to FIG. 14, a major portion of an operation of the object tracking apparatus 10 of this embodiment shown will be described.

Figure 8:
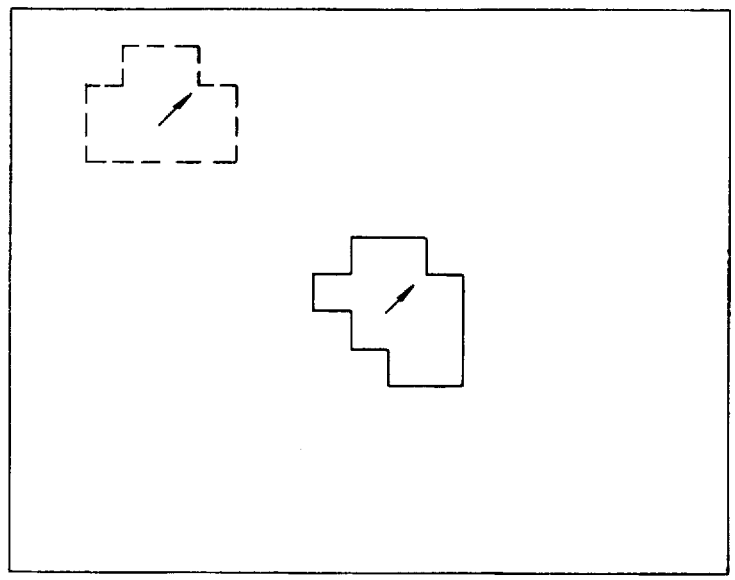
FIG. 8 is an illustrative view showing one example of the tracking area as detected.
Figure 9:
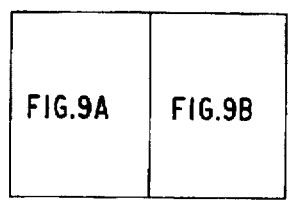
FIG. 9–FIG. 14 are flowcharts showing an operation of the embodiment.
Figure 9A:
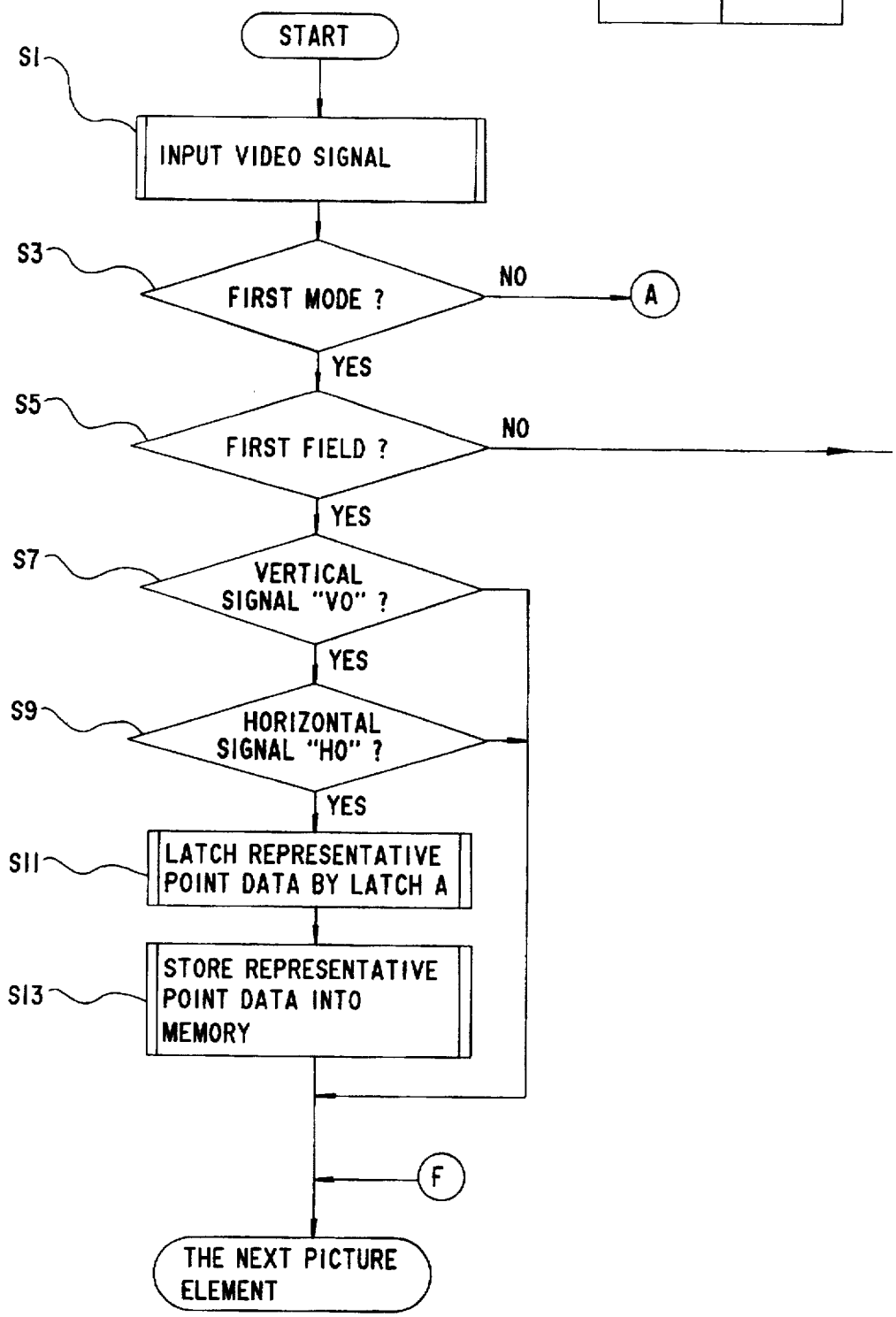
Figure 9B:
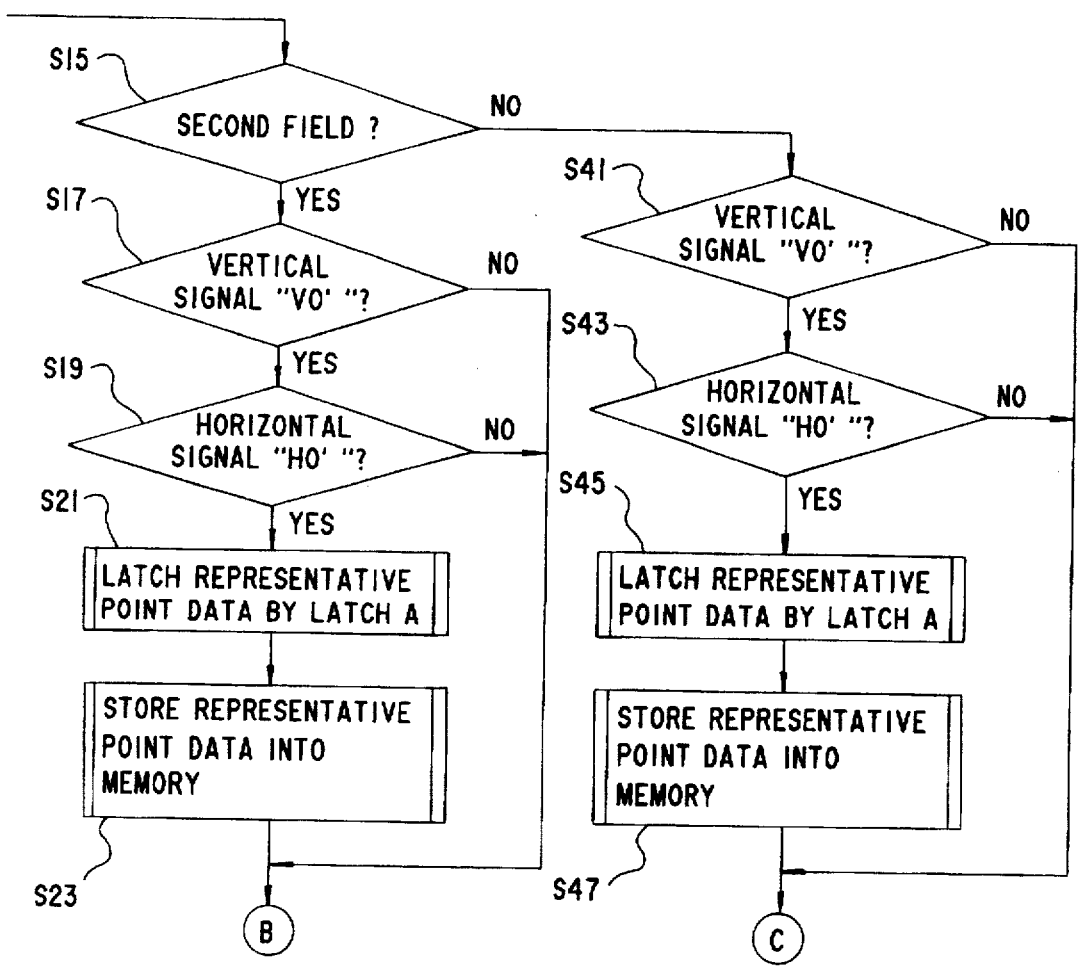

When the video signal is inputted to the A/D converter 24 in a step S1 shown in FIG. 9, it is determined whether the operation mode is the first mode or the second mode in a step S3. If the first mode, steps S5 to S71 are executed to detect the motion vector with using all the detection block 44. In addition, in this case, there is a possibility that two tracking areas having the same motion vector are set as shown in FIG. 8.

In the step S5, it is determined whether or not the present field is the first field, and if "YES", it is determined whether or not the vertical signal V0 and the horizontal signal H0 corresponding to the present pixel are high level in each of the steps S7 and S10. At this time, if even one of the signals is the low level, the process proceeds to steps for the next pixel, if both signals are the high levels, the enable signal is applied to the latch circuit 62 from the AND gate 50. Therefore, the representative point data in the specific detection block 44a is latched by the latch circuit 62 in the step S11, and the representative point data is stored in the representative point memory 66 in the step S13, and thereafter, the process proceeds to steps for the next pixel. In the first field, the steps S1 to S13 is repeatedly executed.

If "NO" in the step S5, it is determined whether or not the present field is the second field in the step S15. At this time, if "YES", it is determined whether or not the vertical signal V0' and the horizontal signal H0' are the high levels in each of the steps S17 and S19. If "NO" in even one of the steps, the process proceeds to the step S25 directly, and if "YES" in the both steps, the enable signal from the AND gate 50 is applied to the latch circuit 62. Then, the representative point data of all the detection blocks 44 are latched in the step S21, and the representative point data is stored in the representative point memory 66 in the step S23, and thereafter, the process proceeds to the step S25. As a result, in the second field, the representative point data of all the detection blocks 44 are stored in the representative point memory 66 through the steps S17 to S23.

If it is determined that the vertical signal V1 is the high level in the step S25, and if it is determined that the horizontal signal H1 is the high level in the step S27, the enable signal from the AND gate 52 is applied to the latch circuit 64. Accordingly, in the second field, the pixel data of x×y in the specific detection block 44a are latched in the step S29.

Furthermore, if it is determined that the vertical signal VI is the high level in the step S25, and if it is determined that the horizontal signal H2 is the high level in the step S31, the enable signal is applied to the latch circuit 68 from the AND gate 54. Accordingly, in the second field, the representative point data of the first field read out from the representative point memory 66 is latched by the latch circuit 68 in the step S33.

In addition, if "NO" in the step S27, the process proceeds to the step S31 directly, and if "NO" in the step S25 or S31, the process proceeds to the step S35 directly.

It is determined whether or not the process for the last pixel of the motion vector detection area 42 is completed in the step S35. If "NO", the process proceeds to steps for the next pixel directly, and if "YES", the correlator 70 calculates the minimum correlation value between the pixel data from the latch circuit 64 and the representative point data from the latch circuit 68, and evaluates the portion motion vector on the basis of the minimum correlation value in the step S37.

More specifically, in assuming that the representative point data of the detection block $44_{ij}$ in the last field is $R_{ij00}$, and each of the pixel data of the detection block $44_{ij}$ in the present field is $S_{ijxy}$, the correlation value $D1_{ij}$ of the both data is calculated according to the following equation (1), and the minimum correlation value is evaluated within a plurality of the correlation values.

$$D1_{ij} = |R_{ij00} - S_{ijxy}| \tag{1}$$

i: number of the detection blocks in the horizontal direction j: number of the detection blocks in the vertical direction Then, the portion motion vector of the detection block $44_{ij}$ during one field is evaluated on the basis of the xy coordinates value corresponding to the minimum correlation value.

Figure 7A:
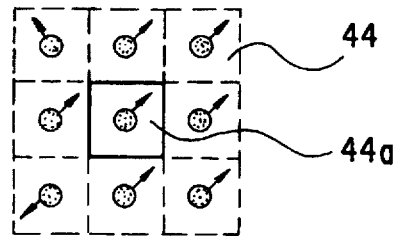
FIG. 7 is an illustrative view showing a tracking area set on the basis of portion motion vectors.
Figure 7B:
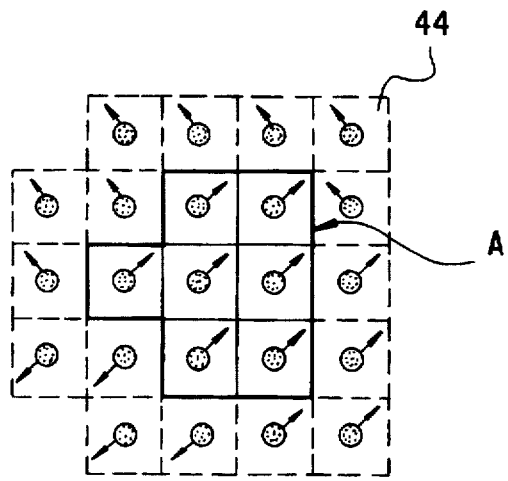
Figure 7C:
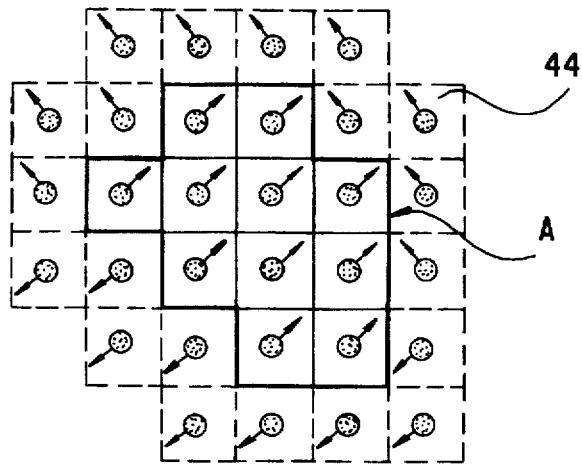

Accordingly, in the second field, the representative point data of all the detection blocks 44 in this field are written in the representative point memory 66, and a portion motion vector as shown in, for example, FIG. 7(a) is evaluated on the basis of all the pixel data included in the specific detection block 44a of this field and the representative point data included in the detection block 44a of the first field. In the step S39, the portion motion vector is inputted and stored into the reference vector generator 74 through the selector 72 as the reference vector for the next field.

If "NO" in the step S15, it is determined that the present field is after the third field, and then, the process proceeds to the step S41. If it is determined that the vertical signal V0' is the high level in the step S41, and if it is determined that the horizontal signal H0' is the high level in the step S43, the enable signal from the AND gate 50 is applied to the latch circuit 62. Accordingly, the representative point data is latched by the latch circuit 62 in the step S45, and the representative point data is memorized into the representative point memory 66 in the step S47, and the process proceeds to the step S49. As a result, the representative point data of the detection blocks 44 of m×n are memorized into the representative point memory 66 in this field through the execution of the steps S41 to S47. In addition, if "NO" in the step S41 or S43, the process proceeds to the step S49.

It is determined whether or not the vertical signal V1' is the high level in the step S49, and it is determined whether or not the vertical signal H1' is the high level in the step S51. Then, if "YES" in the both steps, the enable signal from the AND gate 52 is applied to the latch circuit 64, and therefore, respective pixel data included in the detection blocks 44 are latched by the latch circuit 64 in the step S53. More specifically, by the processes of the steps S49 to S53, the pixel data of the detection blocks 44 of m×n are latched in this field.

Furthermore, it is determined that the vertical signal V1' is the high level in the step S49, and if it is determined that the horizontal signal H2' is the high level in the step S55, the enable signal from the AND gate 54 is applied to the latch circuit 58, and therefore, the representative point data of the detection blocks 44 of m×n in the last field are latched by the latch circuit 68 in the step S57.

Thereafter, it is determined whether or not the process for the last pixel of the motion vector detection area 42 is finished in the step S59. If "NO", the process proceeds to steps for the next pixel. If "YES", the process proceeds to the step S61.

In the step S61, the pixel data of the present field from the latch circuit 64 and the representative point data of the last field from the latch circuit 68 are inputted into the correlator 70, and therefore, the correlation values $D1_{00}$ to $D1_{mn}$ are calculated, and the portion motion vectors of m×n are evaluated on the basis of the minimum correlation values of the detection blocks 44.

Accordingly, in the third field, the representative point data of all the detection blocks 44 of this field are stored in the steps S41 to S47, and the portion motion vectors are evaluated on the basis of the minimum correlation values between the pixel data of this field and the representative point data of the second field in the steps S49 to S61. In addition, the representative point data in the second field are obtained by the processes of the steps S17 to S23. After a forth field, all the representative point data of the present field are stored in the steps S41 to S47, and the portion motion vectors are evaluated on the basis of the minimum correlation values between the pixel data of the present filed latched in the steps S49 to S53 and the representative point data of the last field stored in the steps S41 to S47.

Then, in the step S63, the m×n portion motion vectors are inputted into the correlator 76 through the selector 72, and therefore, a correlation calculation between each of the portion motion vectors and the reference vector is performed.

More specifically, on the assumption that an x component and a y component of the reference vector are $x_{ro}$ and $y_{ro}$, and each of an x component and a y component of the portion motion vector of the detection block $44_{ij}$ are $x_{ijt1}$ and $y_{ijt1}$, the correlation value $D2_{ij}$ can be evaluated by the following equation (2).

$$D2_{ij}=|x_{ro}-x_{ijt1}|+|y_{ro}-y_{ijt1}| \quad (2)$$

The correlation value $D2_{ij}$ is inputted into the tracking area determination circuit 78, and then, it is determined whether or not the correlation value $D2_{ij}$ is smaller than the predetermined threshold value in the step S65. If "YES", it is determined that the tracking area is the area A as shown in, for example, FIGS. 5(b) and 5(c) in the step S67.

The xy coordinates values of the detection blocks 44 constituting the tracking area are inputted into the gravity detection circuit 82, and therefore, the gravity of the tracking area is evaluated. In addition, if two tracking areas are determined as shown in FIG. 8, the gravity becomes a center of the tracking areas. The gravity data is inputted into the motion vector generator 84, and a difference between the position data of the gravity and the center of the screen is outputted from the motion vector generator 84 as a motion vector for controlling the universal head 20.

Further more, in the step S69, the portion motion vectors of the detection blocks 44 constituting the tracking area are inputted into the accumulator 80, and the x component $x_{ijt1}$, and the y component $y_{ijt1}$ of each of the portion motion vectors are accumulated by the following equation (3) to obtain accumulation values $x'_{ro}$ and $y'_{ro}$.

$$x_{ro}' = \sum_{ij} x_{ijt1}/N \quad (3)$$

$$y_{ro}' = \sum_{ij} y_{ijt1}/N$$

N: number of the detection blocks used in calculation

After that, the accumulation values $x'_{ro}$ and $y'_{ro}$ are renewed as the x component $x_{ro}$ and the y component $y_{ro}$ of the reference vector in the step S71. Therefore, it is possible to make the reference vector correspond to a movement amount and a change of a direction of the object, and rotation of the camera 12 in automatic tracking, etc.

As described above, two tracking areas might be evaluated as shown in ,for example, FIG. 8 in the first mode, and in this case, the gravity takes its place between the two tracking areas. To settle this problem, the tracking mode is set into the second mode.

Figure 10:
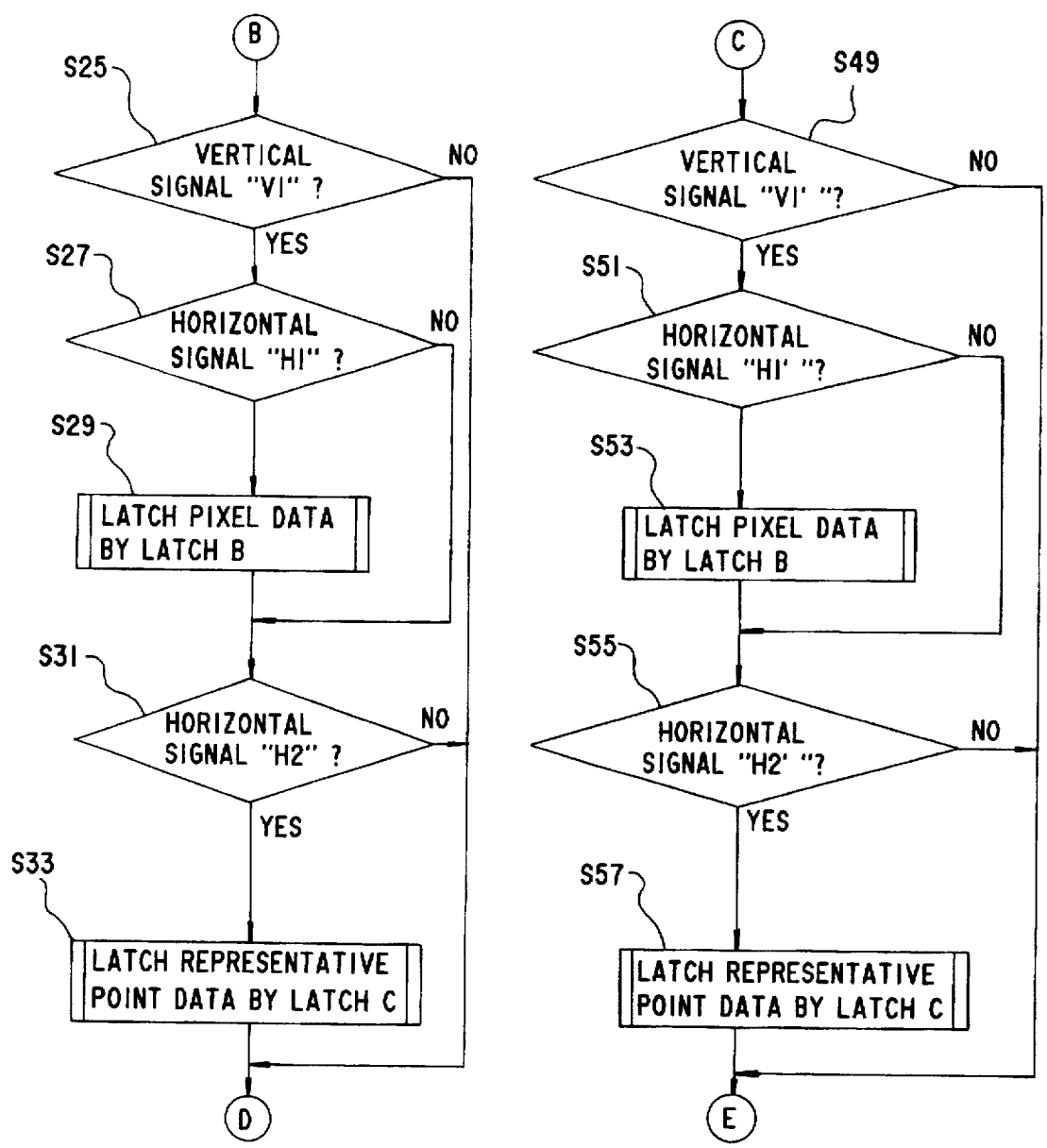
Figure 11:
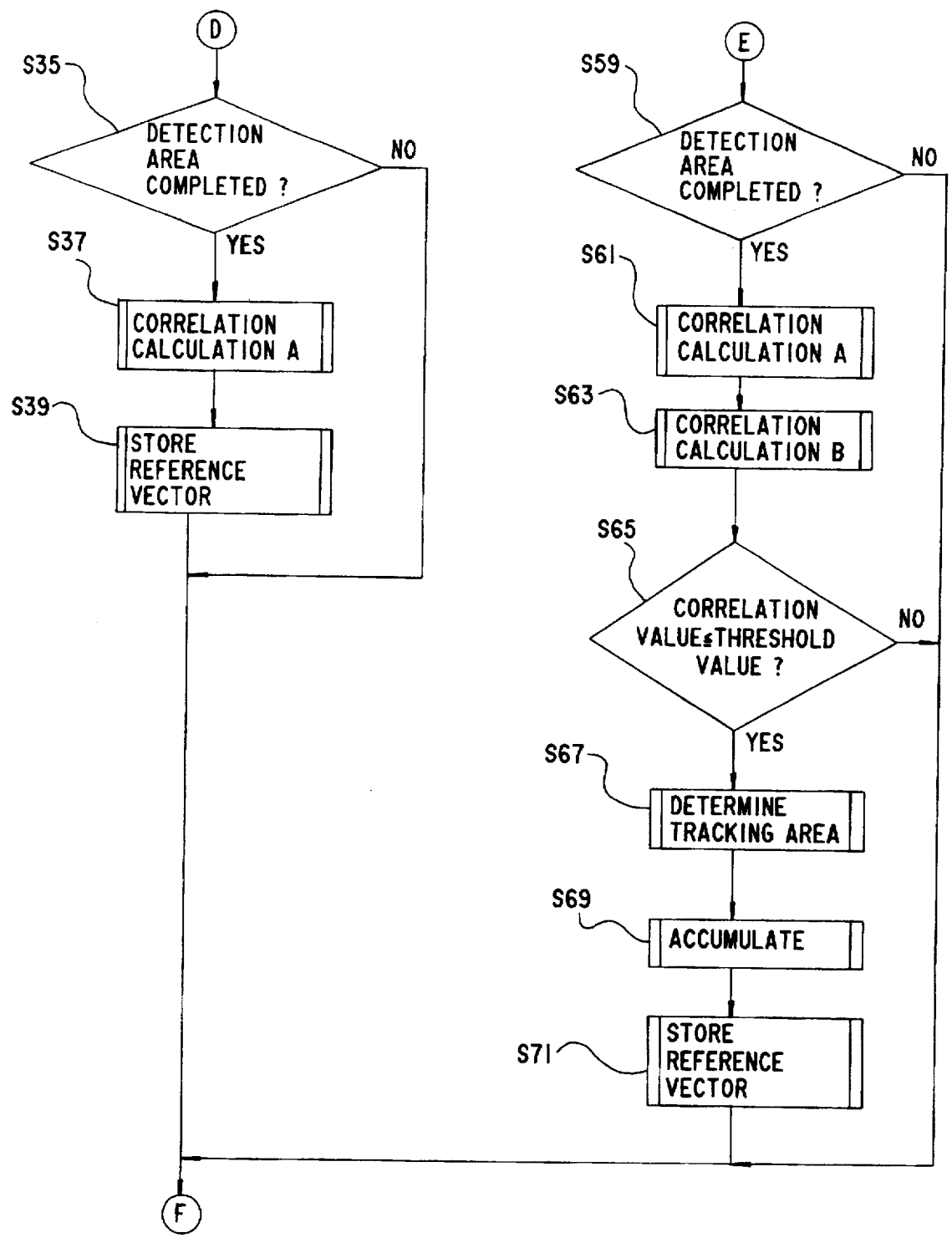
Figure 12:
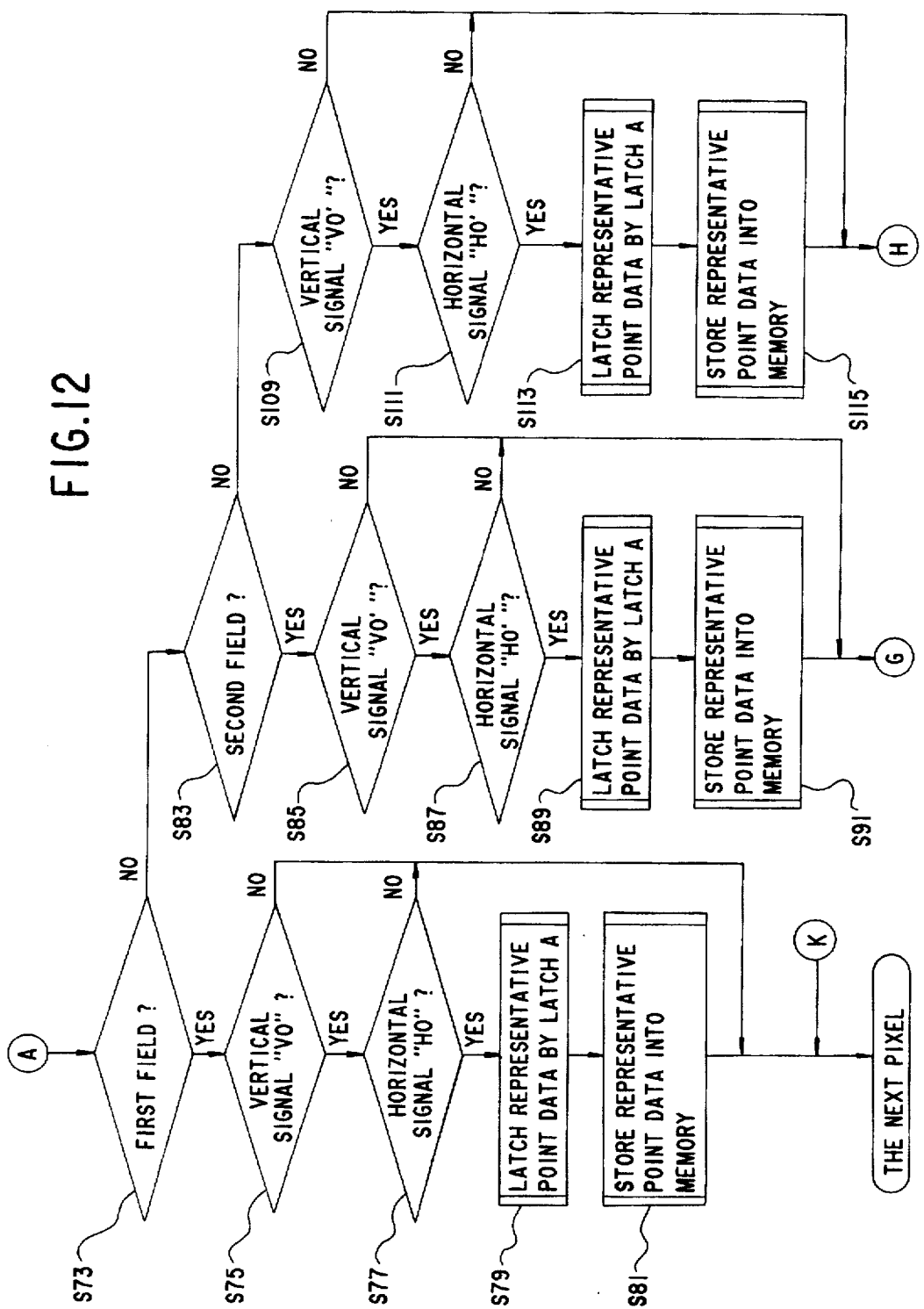
Figure 13:
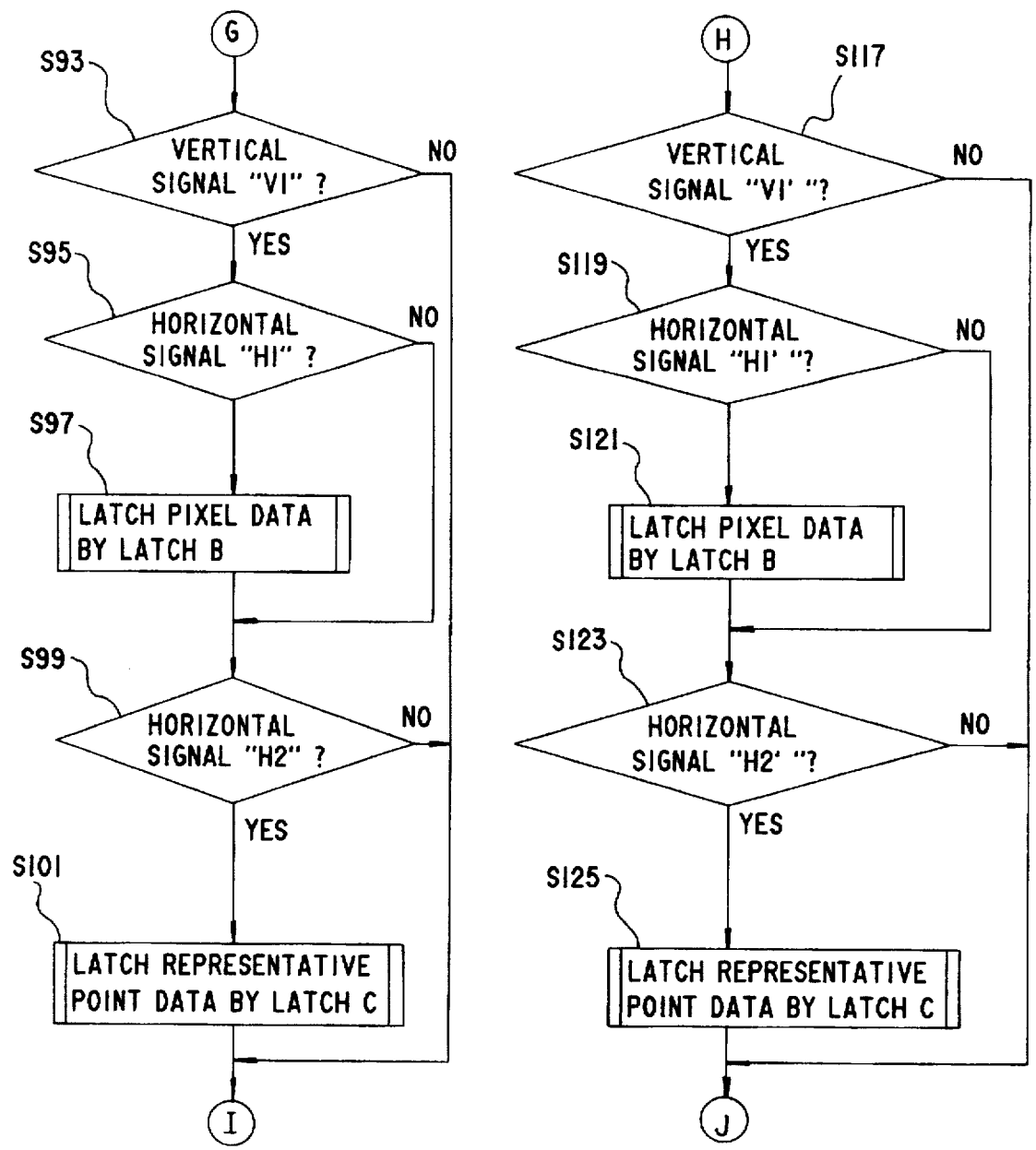
Figure 14:
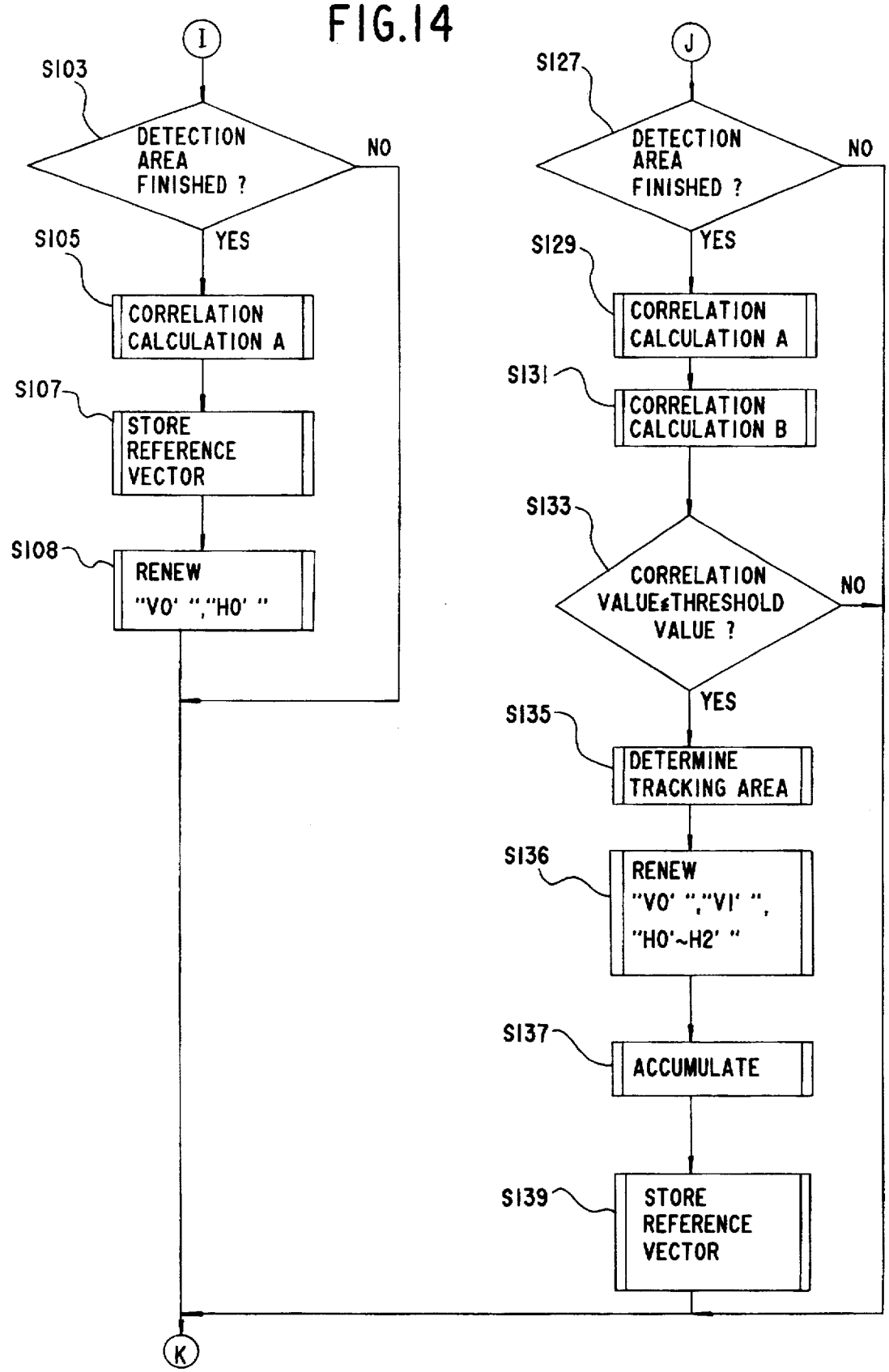

Returning back to the step S3, if it is determined that the tracking mode is the second mode in the step S3, the operation is performed according to flowcharts as shown in FIG. 12 to FIG. 14. Such flowcharts are the same as the flowcharts as shown in FIG. 9 to FIG. 11 except the renewal of the vertical signal V0' and the horizontal signal H0' in a step 108 and the vertical signal V0' and V1' and the horizontal signal H2' in a step S136; however, since the operation after the third field in the second mode becomes to be different from the operation in the first mode by addition of the steps S108 and S136, the operation after the third field will be described mainly.

In the third field, the vertical signal V0' and the horizontal signal H0' become the high levels according to the representative point data of the detection blocks of in total (5 in the horizontal direction and 5 in the vertical direction), the specific detection block 44a being arranged at the center of the blocks. Because the vertical signal V0' and the horizontal signal H0' are renewed in the step S108. Accordingly, representative point data of 25 is stored into the representative point memory 66 in the step S115. Furthermore, the pixel data of the detection blocks 44 of 9 in total (3 ×3), the specific detection block 44a being put at the center of the blocks are latched by the latch circuit 64 in a step S121 because the vertical signal V1' and the horizontal signal H1' become the high level. The representative point data of 9 written in the representative point memory 66 in a step S91 are latched by the latch circuit 68 in a step S125. Accordingly, in a step S129, the correlation calculations are performed between the pixel data of 9 blocks from the latch circuit 64 and the representative point data of 9 blocks from the latch circuit 68, and therefore, the portion motion vectors in the third field can be evaluated. Then, the detection blocks 44 constituting the tracking area are determined in a step S135 on the basis of the reference vector memorized in a step S107. Therefore, in a step S136, the vertical signal V1' and the horizontal signal H1' and H2' are renewed according to an area surrounded by the detection blocks 44 adjacent to the tracking area at the outside of the tracking area by one block, and the vertical signal V0' and the horizontal signal H0' are renewed according to an area surrounded by the detection blocks 44 adjacent to the tracking area at the outside of the tracking area by two blocks.

In and after the fourth field, it is determined whether or not the vertical signal V0' and V1' and the horizontal signal H0' to H2' renewed in the step S136 become the high levels in steps S109, S111, S117, S119 and S123, and then, the operation being the same as the operation in the third field is repeated.

Figure 15A:
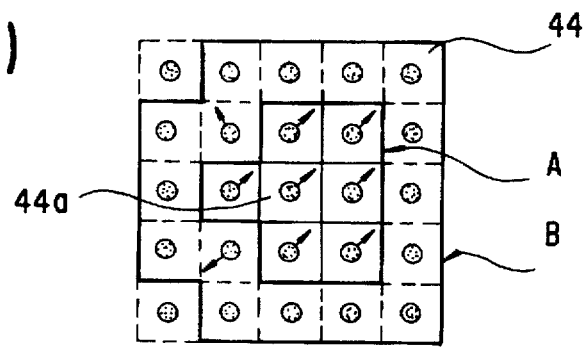
FIG. 15 is an illustrative view showing the tracking area set on the basis of the portion motion vectors.

Since the above described tracking operation is performed in the second mode, in the third field, the representative point data of 25 as shown in FIG. 15(a) are stored in the step S115, and then, the pixel data in the detection blocks 44 of 9 are latched in the step S121, and the representative point data of the last field read from the representative point memory 66 of the detection blocks 44 of 9 are latched. Then, the portion motion vectors of 9 as shown in FIG. 15(a) are evaluated on the basis of the pixel data and the representative point data in the step S129, and therefore, it is determined that the area A as shown in FIG. 15(a) is the tracking area in the step S135. Therefore, the vertical signal V1' and the horizontal signal H0' and H2' are renewed according to the area S136, and then, the vertical signal V0' and the horizontal signal H0' are renewed according to all the detection blocks 44 as shown in FIG. 15(c).

Figure 15B:
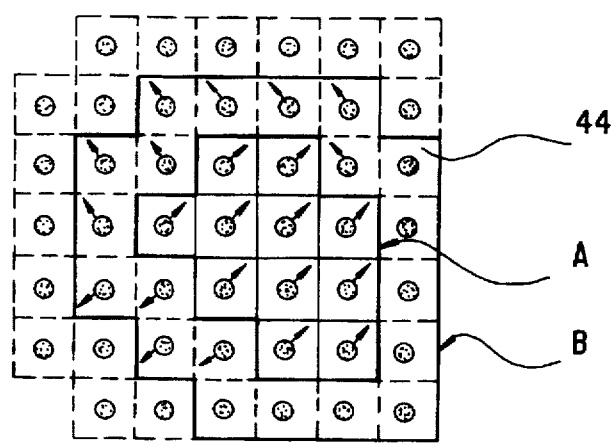
Figure 15C:
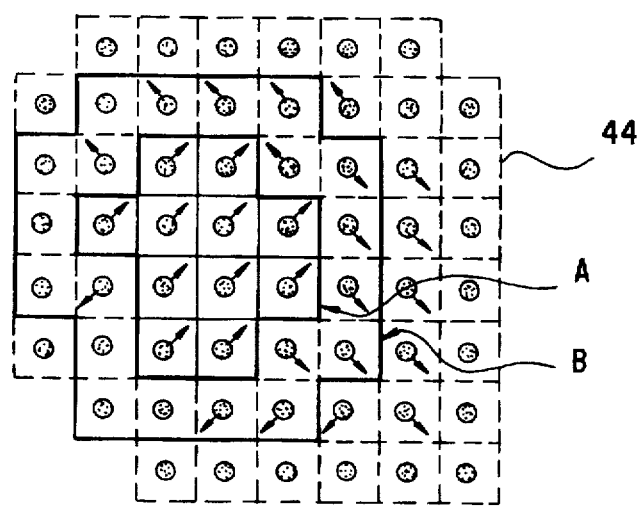
Figure 16A:
FIG. 16 is an illustrative view showing a prior art of a case where a camera is locked.
Figure 16B:
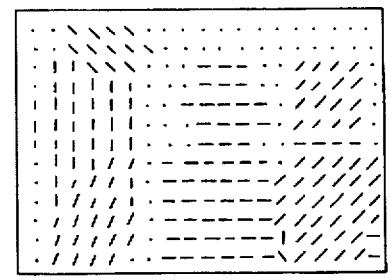
Figure 16C:
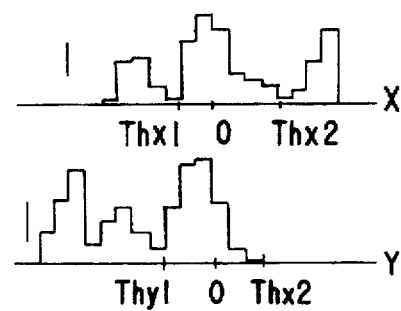
Figure 16D:
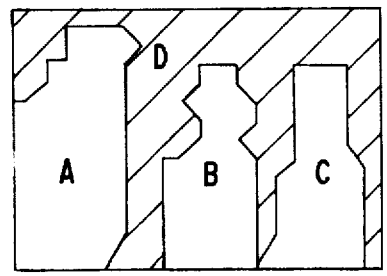
Figure 17A:
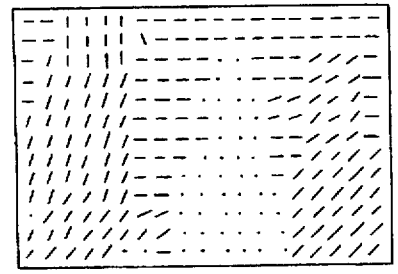
FIG. 17 is an illustrative view showing a prior art in a case where a camera is manually moved to track an object.
Figure 17B:
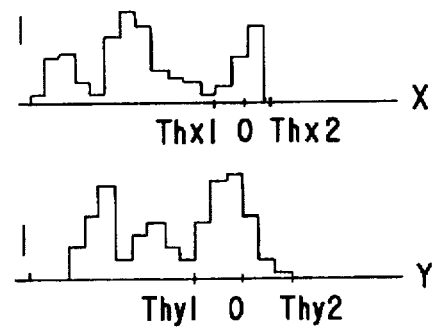
Figure 17C:
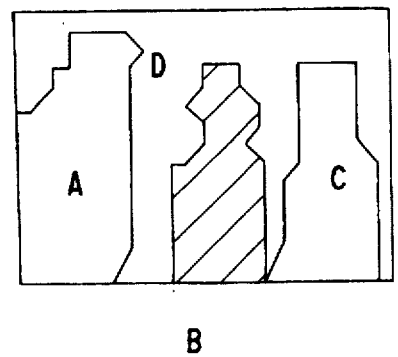

In the fourth field, at first, all the representative point data as shown in FIG. 15 (b) are stored in the step S115. Next, not only pixel data in the area B as shown in FIG. 15(b) are latched in the step S121, but also the representative point data of 23 in the area B as shown in FIG. 15(a) out of the representative point data of 25 written into the representative point memory 66 are latched. Then, the portion motion vectors of 23 are evaluated on the basis of the pixel data and the representative point data in the step S129, and thereafter, it is determined that the area A as shown in FIG. 15(b) is the tracking area in the step S135. Accordingly, in the step S136, the vertical signal V0' and the horizontal signal H1' and H2' are renewed according to the area B as shown in FIG. 15(b), and the vertical signal V0' and the horizontal signal H0' are renewed according to all the detection blocks 44 as shown in FIG. 15(c). Thus, by renewing the vertical signal V0' and V1' and the horizontal signal H0' to H2' according to the movement of the object, and therefore, it is possible to determine only one tracking area including a specific object, and therefore, it is possible to track the specific object.

In addition, in the above described embodiments, the operation is performed at every one field, but it is possible to apply this invention even in the case where the operation is performed at every one frame.

Furthermore, in the above described embodiments, the area A is defined by the detection blocks adjacent to the tracking area by one block, but the extent of the area A should be determined by taking a movement speed of the object into consideration. Therefore, the area A may be defined by the detection blocks adjacent to the tracking area by two or more blocks. Furthermore, in response to the extent of the area A, the extent of the area B should be changed. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tracking area determination apparatus which determines an object tracking area within a screen, comprising:

a first correlation means for evaluation a portion motion vector for each of a plurality of detection blocks formed in said screen on the basis of a minimum correlation value between representative point data in a last field and pixel data in a present field of said plurality of detection blocks;

a second correlation means for evaluating a vector correlation value between said portion motion vector and a reference vector for each of said plurality of detection blocks;

a determination means for determining detection blocks by which an object tracking area is to be defined on the basis of comparison of said vector correlation value and a predetermined threshold value for each of said plurality of detection blocks; and a reference vector detection means for evaluating said reference vector for a subsequent field on the basis of the portion motion vectors of the detection blocks constituting said object tracking area.

2. A tracking determination apparatus according to claim 1, further comprising a first mode setting means for setting an operation mode into a first mode, wherein said portion motion vector is evaluated by said first correlation means by utilizing all the detection blocks formed in said screen in said first mode.

3. A tracking determination apparatus according to claim 1, further comprising a second mode setting means for setting an operation mode into a second mode, wherein said portion motion vector is evaluated by said first correlation means by utilizing detection blocks which are determined in the last field to constitute said tracking area and detection blocks adjacent to an outside of said tracking area by at least one block in said second mode.

4. An object tracking apparatus which tracks an object within a screen, comprising:

a first correlation means for evaluating a portion motion vector for each of a plurality of detection blocks formed in said screen on the basis of a minimum correlation value between representative point data in a last field and pixel data in a present field of said plurality of detection blocks;

a second correlation means for evaluating a vector correlation value between said portion motion vector and a reference vector for each of said plurality of detection blocks;

a determination means for determining detection blocks by which a tracking area is to be defined on the basis of comparison of said vector correlation value and a predetermined threshold value for each of said plurality of detection blocks;

a gravity detection means for evaluating a gravity of said tracking area;

a motion vector generation means for generating a motion vector on the basis of positions of said gravity and a center of said screen; and a tracking means for tracking said object according to said motion vector.

5. A tracking determination method for determining an object tracking area within a screen, comprising steps of:

(a) evaluating a portion motion vector for each of a plurality of detection blocks formed in said screen on the basis of a minimum correlation value between representative point data in a last field and pixel data in a present field of said plurality of detection blocks;

(b) evaluating a vector correlation value for each of said plurality of detection blocks between said portion motion vector and a reference vector;

(c) determining detection blocks by which a tracking area is to be defined on the basis of comparison of said vector correlation value and a predetermined threshold value for each of said plurality of detection blocks; and (d) evaluating said reference vector for a subsequent field on the basis of the portion motion vectors of the detection blocks constituting said tracking area.

6. A tracking area determination method according to claim 5, wherein in said step (a), when an operation mode is set into a first mode, all the detection blocks formed in said screen are used as said plurality of detection blocks.

7. A tracking area determination method according to claim 5, wherein in said step (a), when an operation mode is set into a second mode, detection blocks determined in the last field to constitute said tracking area and detection blocks adjacent to said tracking area at an outside thereof by at least one block is used as said plurality of detection blocks.

8. An object tracking method which tracks an object in a screen, comprising steps of:

(a) evaluating a portion motion vector for each of a plurality of detection blocks formed in said screen on the basis of a minimum correlation value between representative point data in a last field and pixel data in a present field of a plurality of detection blocks;

(b) evaluating a vector correlation value for each of said plurality of detection blocks between said portion motion vector and a reference vector;

(c) determining detection blocks by which a tracking area is to be defined on the basis of comparison of said vector correlation value and a predetermined threshold value for each of said plurality of detection blocks;

(d) evaluating a gravity of said tracking area;

(e) generating a motion vector on the basis of positions said gravity and a center of said screen; and (f) tracking said object according to said motion vector.

* * * * *